(No Model.) 6 Sheets—Sheet 2

P. A. COUPAL & P. A. VOGT.
ENGRAVING MACHINE.

No. 513,039. Patented Jan. 16, 1894.

WITNESSES:
A. D. Harrison.
W. S. McLeod

INVENTORS:
P. A. Coupal
P. A. Vogt
By Hught Brown Crosley
Attys

THE NATIONAL LITHOGRAPHING COMPANY,
WASHINGTON, D. C.

(No Model.) 6 Sheets—Sheet 3.

P. A. COUPAL & P. A. VOGT.
ENGRAVING MACHINE.

No. 513,039. Patented Jan. 16, 1894.

WITNESSES:
A. D. Harrison.
W. S. McLeod

INVENTORS
P. A. Coupal
P. A. Vogt
By Knight Brown Crossley
Attys.

THE NATIONAL LITHOGRAPHING COMPANY,
WASHINGTON, D. C.

(No Model.)  6 Sheets—Sheet 4.

P. A. COUPAL & P. A. VOGT.
ENGRAVING MACHINE.

No. 513,039.  Patented Jan. 16, 1894.

WITNESSES:
A. D. Harrison.
W. S. McLeod

INVENTORS.
P. A. Coupal
P. A. Vogt,
By Wright Brown Crossley
attys (No Model.) 6 Sheets—Sheet 5.

P. A. COUPAL & P. A. VOGT.
ENGRAVING MACHINE.

No. 513,039. Patented Jan. 16, 1894.

Witnesses
A. D. Harrison
W. S. McLeod

Inventors
P. A. Coupal
P. A. Vogt
By Wright Brown Crossley
Attys.

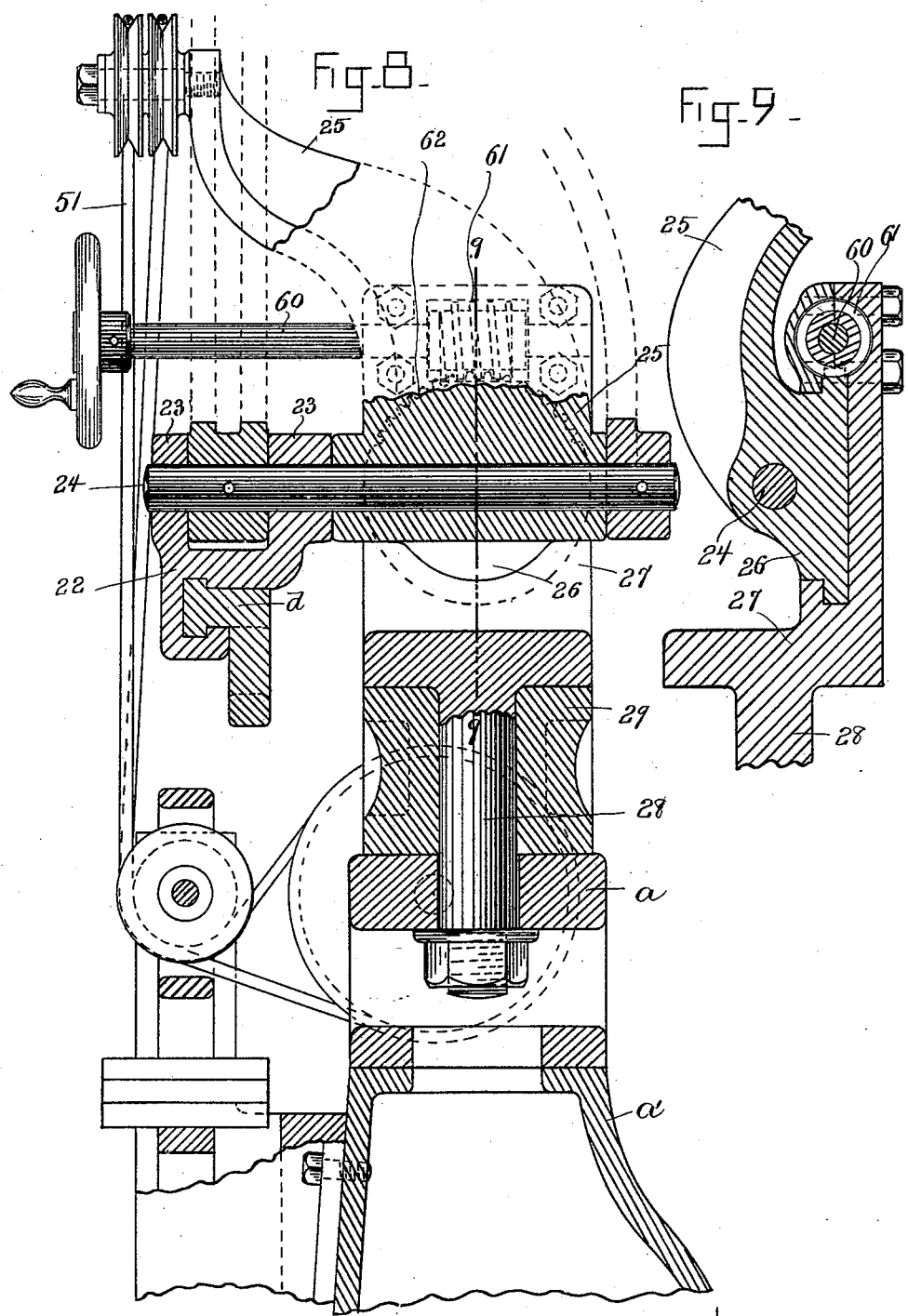

UNITED STATES PATENT OFFICE.

PETER A. COUPAL, OF BOSTON, AND PAUL A. VOGT, OF EVERETT, MASSACHUSETTS.

ENGRAVING-MACHINE.

SPECIFICATION forming part of Letters Patent No. 513,039, dated January 16, 1894.

Application filed April 5, 1893. Serial No. 469,225. (No model.)

*To all whom it may concern:*

Be it known that we, PETER A. COUPAL, of Boston, and PAUL A. VOGT, of Everett, in the county of Middlesex, State of Massachusetts, have invented certain new and useful Improvements in Carving-Machines, of which the following is a specification.

This invention has for its object to provide a machine adapted to make either enlarged or reduced fac-similes of articles of various shapes, such as medallions, busts, &c., and it consists in the improved construction which we will now proceed to describe.

Figure 1:
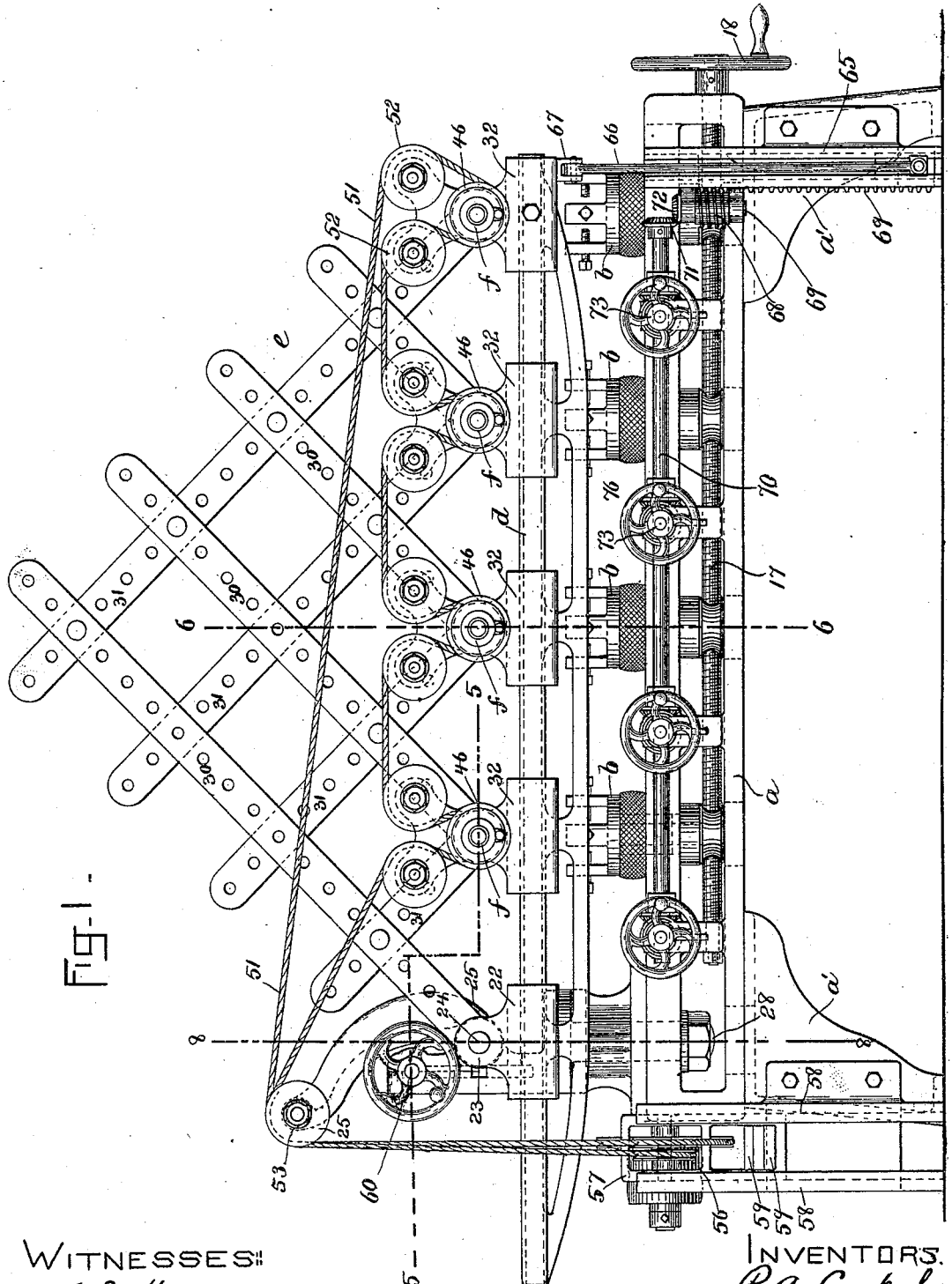
Figure 2:
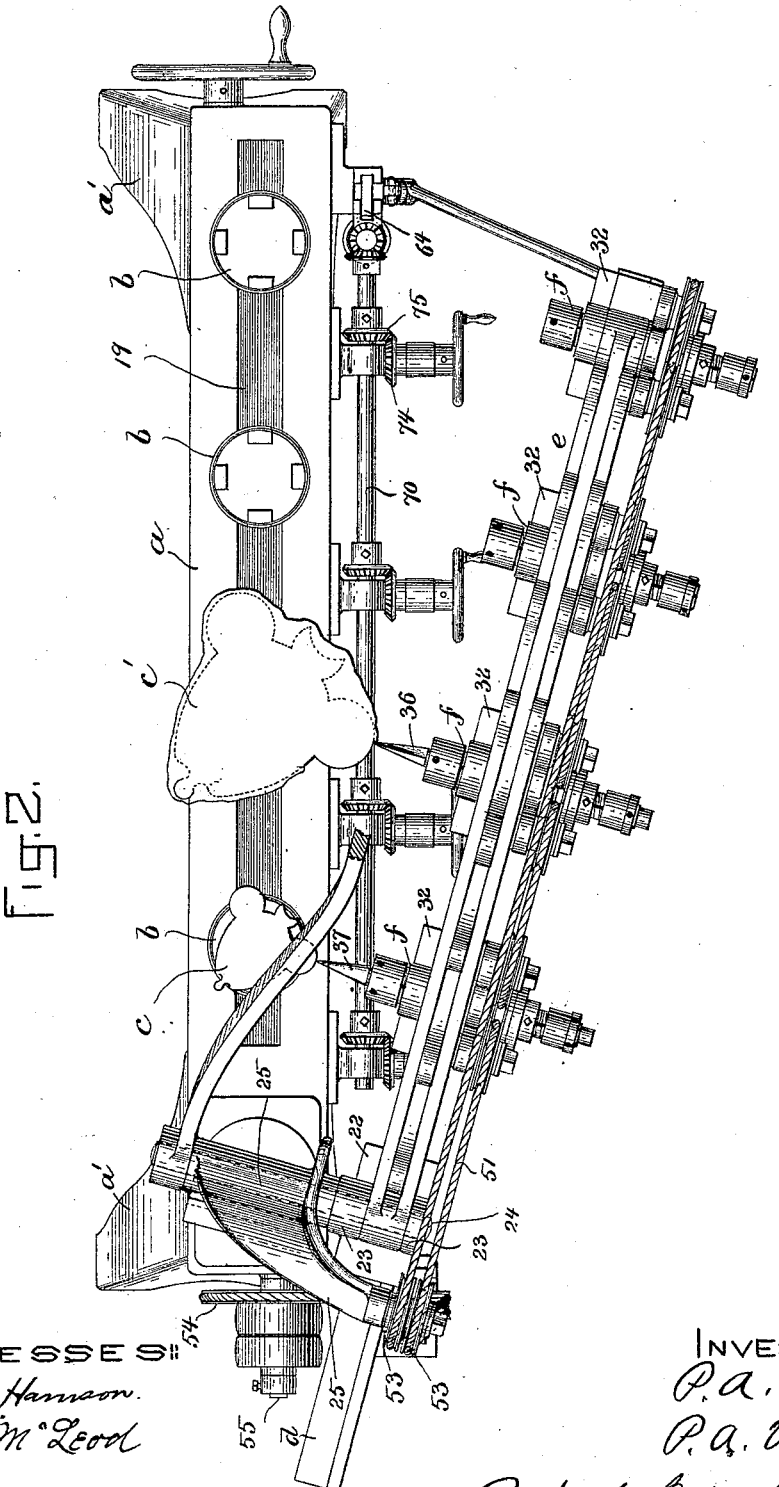
Figure 3:
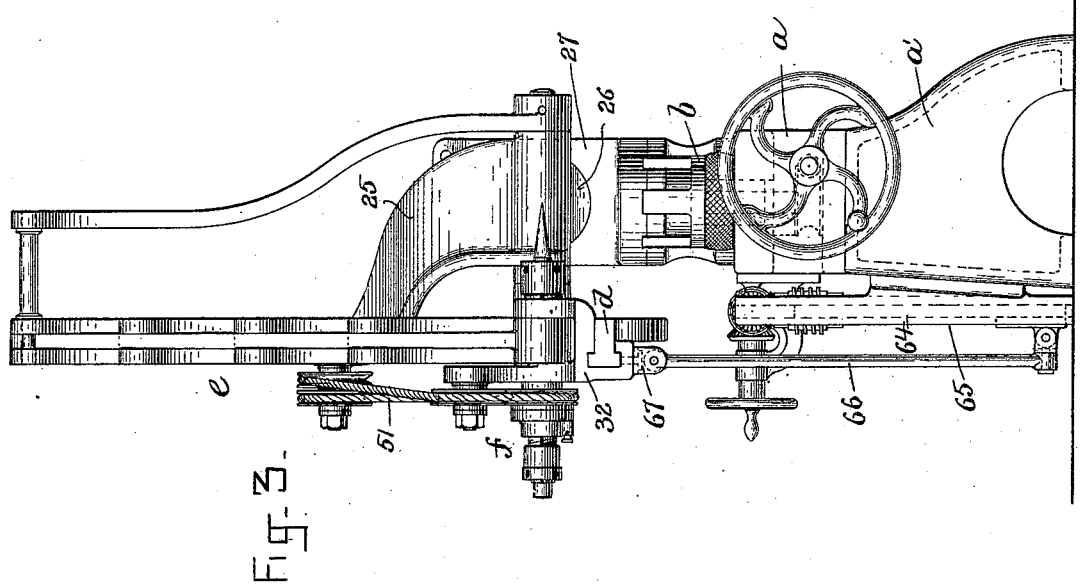
Figure 4:
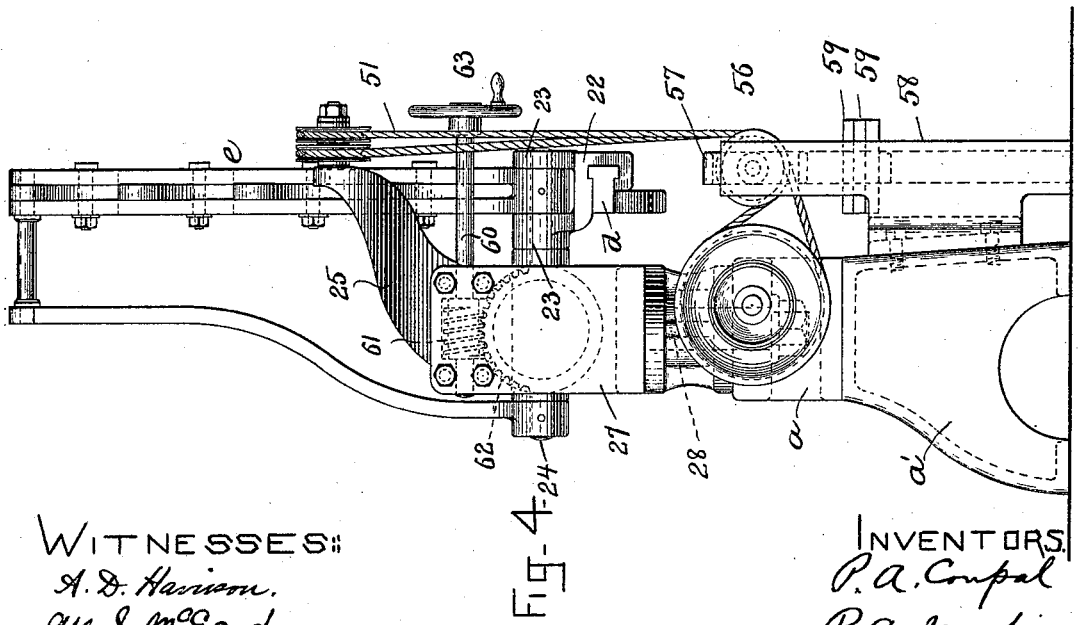
Figure 5:
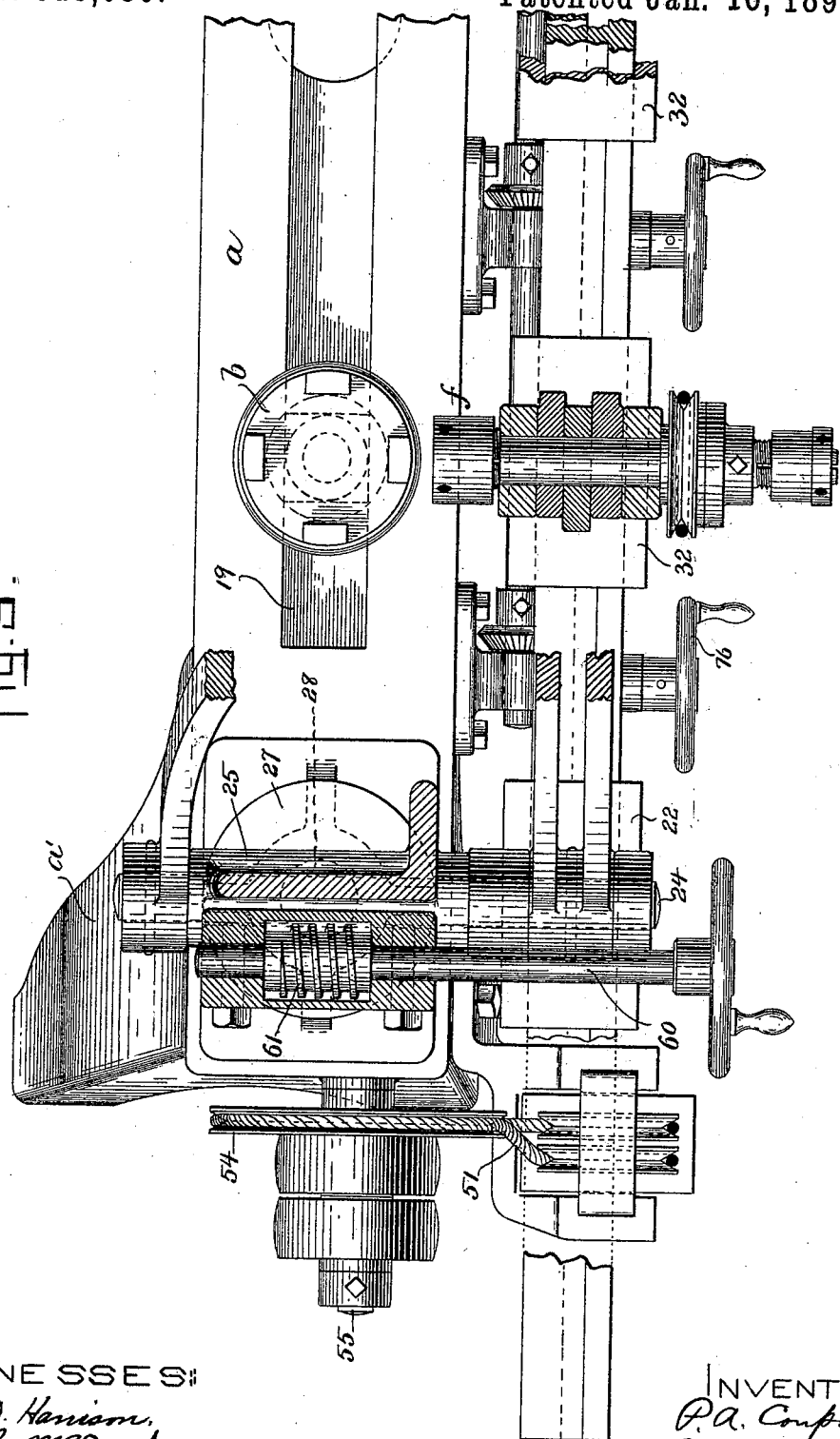
Figure 6:
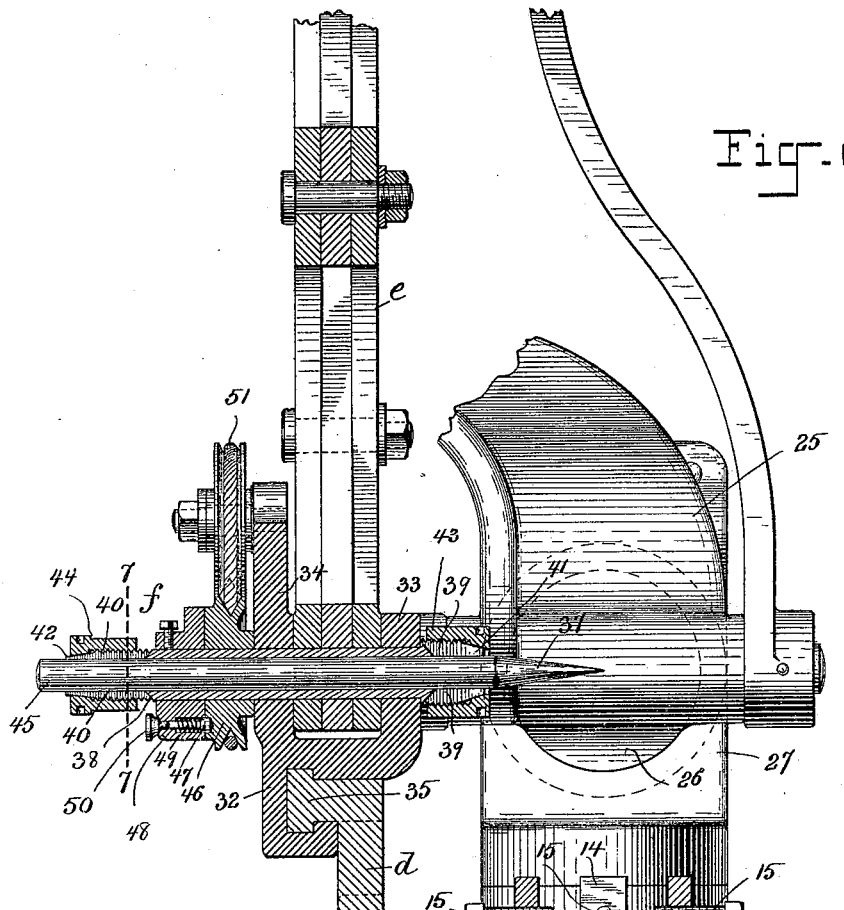
Figure 7:
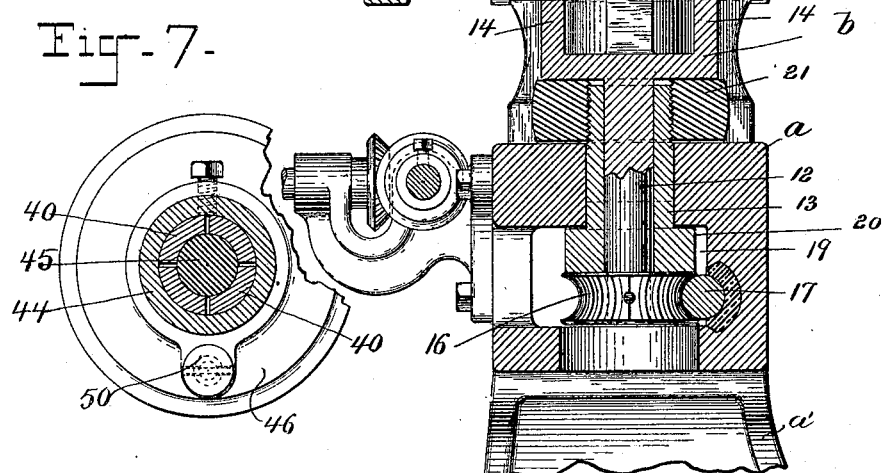

Of the accompanying drawings, forming part of this specification: Figure 1 represents a side elevation of a carving machine embodying our invention. Fig. 2 represents a top plan view of the same. Figs. 3 and 4 represent elevations of opposite ends of the machine. Fig. 5 represents a horizontal section on line 5—5, Fig. 1. Fig. 6 represents a vertical section on line 6—6, Fig. 1. Fig. 7 represents a section on line 7—7, Fig. 1, looking toward the right. Fig. 8 represents a section on line 8—8, Fig. 1. Fig. 9 represents a section on line 9—9, Fig. 8.

The same letters and numerals of reference indicate the same parts in all the figures.

In the drawings: $a$ represents a supporting-frame or bed, mounted on legs $a'$.

$b\ b\ b$ represent a series of rotatable work-holders, which are mounted upon the bed $a$ and are adapted to be rotated simultaneously, and are also adapted to grasp the pattern or former $c$, and the piece or pieces $c'$ from which a reduced or enlarged fac-simile of the pattern is to be made, the pattern being secured to one holder and the piece or blank $c'$ to another. Each holder $b$, as here shown, comprises a vertical shaft or spindle 12, journaled in a bearing 13, which is adjustably secured to the bed $a$ by means hereinafter described; and a frame, comprising arms 14, secured to the upper end of said shaft, said arms having adjustable work-holding devices such as screws 15. A part of the article to be held is inserted between the arms 14 and there secured by the screws 15 or otherwise, our invention not being limited to this particular construction of work-holder.

To the lower end of the shaft 12 is affixed a worm-gear 16, engaged with a horizontal worm-shaft 17 extending lengthwise of the bed, said worm-shaft engaging with the worm-gears of all the holders, as shown in Fig. 1. The worm-shaft 17 is or may be provided at one end with a hand-wheel 18, whereby it may be rotated to simultaneously rotate the holders $b$.

We prefer to make each holder adjustable lengthwise of the bed, and to this end we provide the bed with a longitudinal way or slot 19, the lower portion of which is enlarged, as shown in Fig. 6, to form shoulders, engaged with a circular shoulder 20 on the bearing 13, said bearing being of tubular form, having the shoulder 20 at its lower end, and screw-threaded at its upper end, which projects above the bed $a$. 21 represents a nut, which is screwed upon the upper end of the bearing 13, and, when turned down to bear upon the upper surface of the bed $a$, co-operates with the shoulder 20 in firmly securing the bearing to the bed. When the nut 21 is turned in the opposite direction, it releases the bearing 13 and permits it to be moved freely lengthwise in the slot or guide 19. The nut 21 may be provided with a series of orifices to receive an operating lever or handle.

$d$ represents a bar, which is connected at one end with the supporting-frame, in such manner that it can swing both horizontally and vertically, and can be turned or rocked on its own longitudinal axis.

The means here shown for connecting the bar $d$ with the supporting-frame are as follows: To the bar $d$, near one end thereof, is connected a slide 22, having ears 23 23, fitted to turn easily on a shaft 24, which is journaled in a bearing formed in an arm 25. On said arm 25 is a trunnion 26, which is fitted to turn in a bearing or ear 27, the latter being formed on a vertical shaft 28, which is fitted to turn in fixed bearings 29 on the supporting-frame.

The described construction enables the bar $d$ to have the following swinging movements, namely: first, a movement in a vertical plane on the shaft 24; second, an up and down swinging movement throughout its entire length, produced by the rotation of the trunnion 26 in the bearing 27, this movement permitting the shaft 24 to be inclined, and thus tip or incline the bar $d$; third, a lateral or horizontal swinging movement, caused by the rotation of the shaft 28 in its fixed bearings 29. It will be seen, therefore, that the bar $d$ is capable of moving in various directions, so that the tracing-tool and the cutting-tool or tools hereinafter described, supported by said bar, will have a wide freedom of movement.

The bar $d$ supports a pantograph $e$, composed of a plurality of members 30 and a corresponding plurality of members 31, said members being jointed together after the usual manner of constructing a pantograph. The lower ends of the members 30 and 31 are joined to ears 33 34 (Fig. 6), formed on slides 32, which are fitted to slide upon the bar $d$, said bar having a flange or guide 35 engaged with said slides.

Each slide 32 is provided with a chuck $f$, capable of holding a tool such as a cutting tool 36 and a tracer 37 (Fig. 2), the chuck shown in Fig. 6 being provided with a tracer. The shanks of said tools are formed alike, so that the tools can be used interchangeably with the different chucks $f$.

The construction of each chuck is shown in detail in Fig. 6, in which 38 represents a sleeve, extending through the ears 33 34 and the meeting ends of the pantograph members 30 31, said sleeve being split at its ends by slots 39 at one end and slots 40 at the other end. The extremities of the sleeve have tapered seats 41 42, on which bear the correspondingly tapered inner surfaces of nuts 43 44, the arrangement being such that, when said nuts are turned inwardly, their tapered portions, acting on the seats 41 42, compress the split portions of the sleeves 38, thus causing said portions to bind upon the shank 45 of the tool inserted in the sleeve.

Each chuck is provided with a pulley 46, which is normally loose upon the sleeve 38, and is engaged therewith by means of a clutch-pin 47, inserted in a collar 48 rigidly affixed to said sleeve, one end of said pin being adapted, by means of a spring 49, to engage a socket in one side of the pulley 46. The pin 47 has a head or handle 50, by which the operator may withdraw it from engagement with the pulley when it is desired to stop the rotation of the chuck. The chucks are rotated simultaneously by means of a driving-belt or band 51, running upon the pulleys 46, and upon idle pulleys 52, journaled in bearings formed on the ears 34, there being two pulleys 52 on each ear 34. The band 51 also passes over idle pulleys 53 53, mounted on the arm 25 above described. Motion is imparted to the band 51 by a pulley 54, affixed to the driving-shaft 55, which shaft may be rotated by any suitable means. The band is kept under the proper degree of tension by means of a weighted pulley 56, which is journaled in bearings in a sliding frame 57, fitted to slide vertically in guides 58 on the supporting-frame, said sliding frame being adapted to hold detachable weights 59, so that the tension of the band may be regulated. The weighted frame, acting as described on the band, also serves to counterbalance the weight of the bar $d$ and the chucks and pantograph thereon, so that the bar will stand at any inclination to which it may be adjusted by the operator. It will be seen that, by the described means, the chucks and the tools held thereby may be simultaneously rotated, and that the bar $d$, the pantograph and the chucks supported by said bar may be moved to any position they are capable of assuming, without affecting the operative connection between the chucks and the driving-shaft. It will further be seen that the slides 32 may be moved longitudinally to vary the distance between them and between the chucks and the operating tool.

The work performed by a cutting-tool 36 held in one of the chucks is governed by the tracer 37 held in another chuck and the pattern $c$ held by one of the holders $b$. If it is desired to make an enlarged fac-simile of the pattern, the tracer is located between the cutting-tool and the inner end of the bar $d$, as shown in Fig. 2, the degree or extent to which the work is enlarged being determined by the spacing or distance between the chucks, this being regulated by the adjustment of the pantograph. If it is desired to make a reduced fac-simile, the positions of the tracer and the cutting-tool are reversed.

It will be seen that the described freedom of movement of the chucks and the tools held thereby enables the operator to readily reproduce on a blank $c'$ a great variety of forms which may be possessed by the pattern $c$, so that it will be possible to reproduce either enlarged or reduced copies of a bust or statue, a medallion, and various other articles, in wood, stone and any material capable of being acted on by the rotary cutting tools.

I have provided means whereby the operator may incline the arm 25, for the purpose of laterally tipping the bar $d$ and giving the chucks any desired angle, said means, as here shown, being a shaft 60, journaled in bearings in the ear or bearing 27 and provided with a worm 61 meshing with a worm-gear 62 affixed to the arm 25. The shaft 60 is provided with a hand-wheel 63, by which it may be rotated to impart any desired extent of rotary motion to the arm 25 and thus laterally tip the bar $d$ and raise or lower the points of the tools carried by the chucks of said bar.

Means are provided whereby the operator, standing at or near either of the chucks, may raise or lower the swinging outer end of the bar $d$. Said means, as here shown, comprise a rack 64, fitted to move in a fixed vertical guide 65 on the supporting-frame; a connecting-rod 66, pivotally connected at its upper end to ears 67 on the outer slide 32 (Figs. 1 and 3), and at its lower end to the rack 64; a worm 68, on a vertical shaft 69 journaled in fixed bearings on the supporting-frame, said worm meshing with the rack 64; a horizontal shaft 70, journaled in bearings on the bed $a$ and extending lengthwise of said bed, and provided at one end with a bevel-gear 71 meshing with a similar gear 72 on the shaft 69; and a series of short operating shafts 73, journaled in bearings on the bed $a$, and arranged at right angles with the shaft 70, said shafts 73 having bevel-gears 74 at their inner ends, meshing with bevel-gears 75 affixed to the shaft 70. It will be seen that there are as many shafts 73 in this case as there are chucks, said shafts being arranged in close proximity to the chucks, so that an operator standing near any chuck can rotate the shaft 70, and thus impart, through the shaft 69 and worm 68, a vertical movement to the rack 64, which movement is imparted through the rod 66 to the bar $d$ and its appurtenances. Each of the shafts 73 is preferably provided with a hand-wheel 76, whereby it may be conveniently rotated.

The operation of the machine is as follows: The pattern $c$ being affixed to one of the holders $b$ and the blank $c'$ affixed to another holder, the tracer 37 is adjusted to bear upon the pattern, and a cutting-tool 36 is adjusted to act upon the blank. The operator manipulates the bar $d$ so as to give the chucks the desired successive adjustments required to enable the tracer to follow the contour of the pattern, and the cutting-tool to produce a corresponding contour on the blank $c'$. The operator from time to time partly rotates the series of holders $b$, by means of the screw or worm-shaft 17, thus presenting fresh faces on the pattern and fresh parts of the blank respectively to the tracer and cutting-tool as the work progresses, and, between the partial rotations of the holders, the operator gives the chucks the required movements in order to enable them to properly perform the work, said movements varying according to the nature of the work.

The weighted pulley 56, adapted to slide vertically, constitutes an automatic tension device, which keeps the belt taut under all adjustments of the chucks. Any other suitable automatic tension device may be used for this purpose, without departing from the spirit of our invention.

We claim—

1. In a carving machine, the combination of an arm or bar connected by a universal joint with a fixed support, a pantograph on said bar, a series of chucks connected with said bar and pantograph, means for simultaneously rotating said chucks, a series of holders adjustably secured and arranged to correspond with the chucks, and means for simultaneously rotating said holders, as set forth.

2. In a carving machine, the combination of an arm or bar, a supporting-frame, a universal joint connection between said bar and frame, a series of slides adjustable on said bar, a series of chucks mounted on said slides, each having a pulley, a pantograph connecting said slides, idle-pulleys arranged in pairs on the slides, and a driving-belt engaged with the said chuck-pulleys and idle-pulleys, as set forth.

3. In a carving machine, the combination of an arm or bar, a supporting-frame, a universal joint connection between said bar and frame, a series of slides adjustable on said bar, a series of chucks mounted on said slides, each having a pulley, a pantograph connecting said slides, idle-pulleys arranged in pairs on the slides, a driving-belt engaged with the said chuck-pulleys and idle-pulleys, and an automatic device for exerting tension on said belt, as set forth.

4. In a carving machine, the combination of a supporting-frame, a bearing 27 connected by a vertical pivot with said frame and adapted to swing in a horizontal plane, an arm 25 connected with said bearing by a horizontal pivot and adapted to swing in a vertical plane, a bar $d$ connected with said arm by a horizontal pivot at right angles to the pivot of the arm 25, a series of slides movable on said bar, a series of chucks journaled in said slides, each having a pulley, idle-pulleys connected in pairs with the chuck bearings, idle-pulleys on the arm 25, a pantograph connecting said slides, a belt engaged with the above-mentioned pulleys, and an automatic device for exerting tension on the belt, as set forth.

5. In a carving machine, the combination of a supporting-frame, a bearing 27 connected by a vertical pivot with said frame and adapted to swing in a horizontal plane, an arm 25 connected with said bearing by a horizontal pivot and adapted to swing in a vertical plane, a bar $d$ connected with said arm by a horizontal pivot at right angles to the pivot of the arm 25, a series of slides movable on said bar, a series of chucks journaled in said slides, means for simultaneously rotating said chucks, a pantograph connecting the slides, and means such as the worm 61 and worm-gear 62 for imparting rotary motion to the arm 25, as set forth.

6. In a carving machine, the combination of an arm or bar connected by a universal joint with a fixed support, a pantograph on said bar, a series of chucks connected with said bar and pantograph, means for simultaneously rotating said chucks, and mechanism for imparting a vertical swinging movement to said bar and the parts carried thereby, as set forth.

7. In a carving machine, the combination of an arm or bar connected by a universal joint with a fixed support, a pantograph on said bar, a series of chucks connected with said bar and pantograph, means for simultaneously rotating said chucks, a vertically-movable rack on the supporting-frame, connections between said rack and the outer end of said bar, and means such as the worm 68, shaft 70 and operating shafts 73 for imparting vertical movements to said rack, as set forth.

In testimony whereof we have signed our names to this specification, in the presence of two subscribing witnesses, this 25th day of March, A. D. 1893.

PETER A. COUPAL.
PAUL A. VOGT.

Witnesses:
C. F. BROWN,
F. PARKER DAVIS.